Oct. 6, 1936.                    G. LERCH                    2,056,579
                           CALCULATING MACHINE
                           Filed Nov. 13, 1929
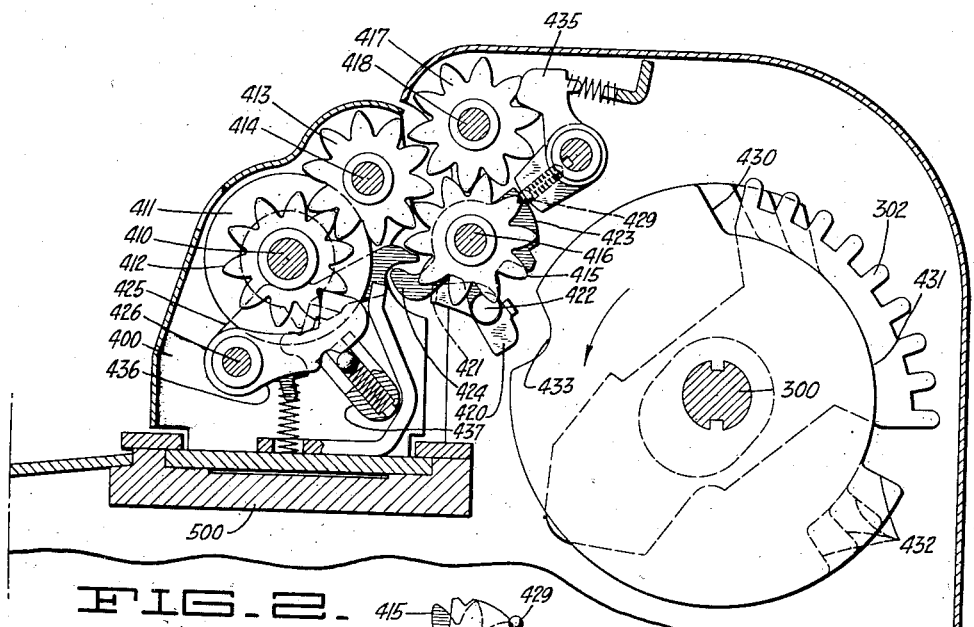
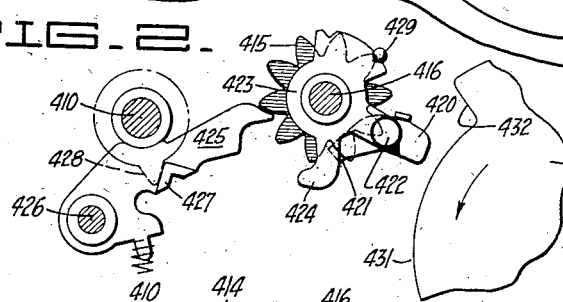
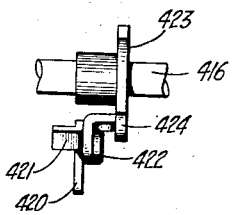
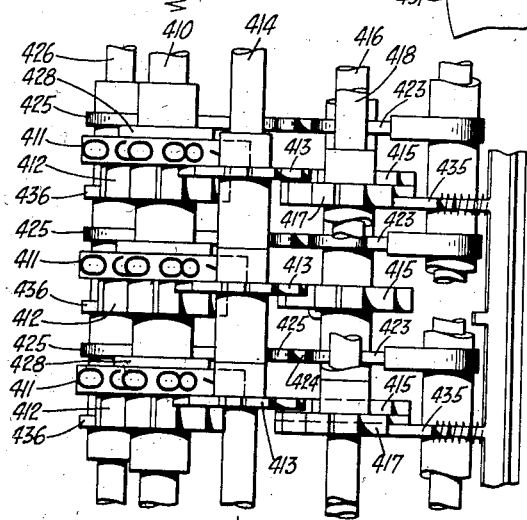
INVENTOR.
Gustav Lerch
BY
*Theodore H. Lassagne*
ATTORNEY Patented Oct. 6, 1936

2,056,579

UNITED STATES PATENT OFFICE 2,056,579

CALCULATING MACHINE

Gustav Lerch, Oakland, Calif., assignor to Marchant Calculating Machine Company, a corporation of California Application November 13, 1929, Serial No. 406,840

7 Claims. (Cl. 235—138)

The present invention relates to calculating machines, and particularly to tens-carry mechanism therefor. This carry mechanism is of the type in which an independent actuator operates the various numeral wheels successively in ascending order, and is especially designed for a type of calculating machine in which the differential actuators for the numeral wheels operate in one direction only, the numeral wheels being reversible by means of reversing gears disposed in the train between such numeral wheels and such differential actuators. According to the present invention, the carry actuator is also rotatable in one direction only, and the same reversing mechanism which is used to reverse the direction of differential operation of the numeral wheels is used to reverse the direction of their operation in carrying.

It is an object of the present invention to provide an improved tens-carrying mechanism for calculating machines.

It is an object of the present invention to provide a common reversing mechanism operable both in digitation and in carrying to reverse the direction of operation of numeral wheels by an actuator which is operated in one direction only.

It is an object of the present invention to provide such mechanism in a machine in which the numeral wheels are capable of ordinal shift relative to their actuator.

It is an object of the present invention to provide a carry mechanism which will be restored, ready for further operations, by its operation in carrying.

Other objects of the invention will appear as the description progresses.

An example of the machine embodying the invention is described in the accompanying specification and in the drawing forming a part thereof, in which:—

Figure 1 is a sectional view of the assembled mechanism.

Figure 2 is a sectioned detail showing the carry pawl in carrying position.

Figure 3 is a detail of the carry pawl mechanism.

Figure 4 is a plan of the mechanism shown in Figure 1 with the casing removed.

The carriage 400 is slidably mounted in a trackway 500, and provides a mounting for shaft 410 carrying spaced numeral wheels 411. Fixed to each numeral wheel is a wide pinion 412 meshing with a reversing gear 413 mounted on shaft 414. The shaft 414 is also mounted in the carriage 400, and is laterally shiftable to carry the gears 413 into mesh with either of constantly meshed gears 415 or 417, which are mounted on shafts 416 and 418, respectively, said shafts being journaled in the side frames of the machine. The gear 415 is adapted to be driven by the actuating elements carried on shaft 300, which is always rotated in the direction indicated by the arrow in Figure 1. Both the gears 415 and 417 are always rotated an equal amount in opposite directions, and the direction of the drive of numeral wheel 411 will depend upon which of these gears is engaged by reversing gear 413.

Any suitable type of differential actuator may be used herein, such as, for instance, that disclosed in the patent to Friden No. 1,643,710 dated September 27, 1927, such an actuating segment being shown at 302.

The carrying mechanism is operated whenever any numeral wheel moves from its nine to its zero position, or vice versa, and comprises a carrying pawl 420 having a laterally projecting portion 421 adapted to seat between two teeth of the gear 415 associated with the numeral wheel of the next higher order. The pawl 420 is pivoted at 422 to a carry latch 423 having a nose 424 underlying the tail of carrying lever 425 pivoted on shaft 426, and resiliently supported adjacent a numeral wheel. Carrying pawl 420 is provided with a laterally projecting lug on the upper portion thereof which limits the counter-clockwise oscillation of said pawl by engagement with carry latch 423. The carrying lever 425 is provided with a struck out lug 427 adapted to cooperate with a complementary lugged annulus 428 appropriately positioned on the numeral wheel.

The normal position of the carry mechanism is shown in Figure 1. When the numeral wheel moves from nine to zero, or vice versa, the lugged annulus 428 cams the lever 425 down, moving the latch 423 to the position shown in Figure 2. Latch 423 is held in this position by the spring pressed ball 429, which cooperates with notches in the latching member 423 for this purpose. Carrying lever 425 being constantly spring urged upwardly, lug 427 is maintained in engagement with lugged annulus 428. The oscillation of carrying lever 425 by the lug on the annulus occurs between the 0 and 9 positions of the numeral wheel, said lever being in its normal upper position when the numeral wheel displays either of said numbers so that it does not interfere with lateral shifting of the carriage in which it is mounted and may be moved into cooperation with a plurality of laterally stationary carry latches 423.

Carry actuating discs 430 are fixed to the actuator shaft 300 for rotation therewith. The periphery of these discs is notched at 433, which is opposite pawl 420 at full cycle position, to permit reset of the numeral wheels, but in all other idle portions of the cycle the periphery of these discs abuts the tail of pawl 420, preventing any operation of the numeral wheels. During the digitation portion of the cycle, during which the numeral wheels are differentially set by their actuators, a cut-out portion 431 of disc 430 is opposite the tail of pawl 420, and any pawls which are moved to the rear by the passage of their numeral wheels between zero and nine ride in this cut-out portion until the portion of the cycle in which carrying takes place. When at the end of digitation in each order the end 432 of the cut-out portion 431 strikes the tail of pawl 420, the pawl is first rotated on its axis 422 until the portion 421 thereof strikes the bottom of its associated tooth notch and the pawl and its associated latch 423 are then rotated as a unit on the axis 416, carrying with them the gear 415 to rotate the numeral wheel of the next higher order through one increment. The direction of this rotation will be determined by the setting of the reversing gear 413, and will be the same as in the immediately preceding digitation cycle. The carrying operation also acts to restore all the parts of the carrying mechanism to their normal position, in condition for future carrying operations.

The operating edges 432 of discs 430 are relatively staggered around the periphery of shaft 300 to permit sufficient time for the proper positioning of any pawl 420 which is tripped back, not in a digitation cycle, but as the result of a carrying operation in a lower order, before it is operated by its edge 432.

Since the carriage 400, as hereinbefore set forth, is shiftable relatively to the several orders of the actuator, means are provided which at the same time center the separable trains of gearing and prevent their overthrowing in operation, thus insuring that they will mesh accurately when the carriage is shifted. The stationary train of gearing in each order comprises gears 415 and 417 mounted on shafts 416 and 418, respectively, hereinbefore described as being journaled in the stationary part of the machine. The displaceable train of gearing in each order comprises the gears 412 and 413 which are mounted on shafts 410 and 414, respectively, suitably supported in the displaceable carriage 400. As the carriage 400 is shifted, gear 413 is moved into operative relation with the various orders of stationary gearing 415 and 417. A pawl 436 pivoted on shaft 426 is pressed against the gear 412 associated with the numeral wheels by a spring pressed ball carried in bar 437 which may be rocked to release the spring pressure from pawl 436 as fully described in the British patent to Friden, No. 272,174, accepted February 23d, 1928, while the stationary trains of gearing are centered by a spring pressed pawl 435, the nose of which rides between the teeth of gear 417.

While the preferred construction has been described in the foregoing specification, it is understood that the invention is capable of modification within the scope of the following claims.

I claim:

1. In a machine of the class described, a plurality of reversible accumulator elements, tens-carrying mechanism, means controlled by an accumulator element upon movement in either direction for displacing said mechanism from normal position, means for restoring said mechanism to normal position, means operable as an incident to the operation of said last named means for operating and locking an accumulator element, and means for reversing the direction of operation of said elements by said mechanism.

2. In a register mechanism, numeral wheels, individual driving trains therefor, a pawl associated with one of the gears of each of said trains, means positively operated by a numeral wheel to move said pawl independently of its associated gear, and means for moving said pawl to drive its associated gear and thereafter lock said gear and numeral wheel.

3. In a calculating machine, reversible accumulator elements, carry members operable in one direction by movement of said accumulator elements in either direction and in the other direction to operate said elements, and means for reversing the direction of operation of said elements by said members.

4. In a calculating machine, reversible accumulator elements, carry members operable in one direction by movement of said accumulator elements in either direction and operable to operate said elements during restoration to normal position, and means for reversing the direction of operation of said elements by said members.

5. In a calculating machine, reversible accumulator elements, carry members associated therewith, operable positively in one direction upon movement of said accumulator elements in either direction, means for operating said members in the other direction to first operate and then maintain said elements locked, and means for reversing the direction of operation of said elements by said members.

6. In a calculating machine, accumulator elements, pawling mechanisms for operating said elements in carrying operations, means positively operated by said elements to displace individual pawling mechanisms preparatory to a carrying operation, and means for returning displaced pawling mechanisms to normal position to effect carrying and to lock all said mechanisms, thereby locking said elements.

7. In a calculating machine, reversibly operable accumulator elements, carrying mechanisms settable by operation of said elements in either direction, means for restoring said mechanisms and, as an incident to such restoration, transmitting a carrying impulse through such of said mechanisms as have been set, and means for reversing the direction of said carrying impulse between said mechanisms and said elements.

GUSTAV LERCH.